July 28, 1931. E. J. OPIE 1,815,954
AUTOMATIC CHAIN OR BELT TIGHTENER
Filed Feb. 27, 1928 2 Sheets-Sheet 1

INVENTOR
Ernest John Opie
BY
Pennie Davis Marvin & Edmonds
ATTORNEYS

July 28, 1931.  E. J. OPIE  1,815,954
AUTOMATIC CHAIN OR BELT TIGHTENER
Filed Feb. 27, 1928    2 Sheets-Sheet 2
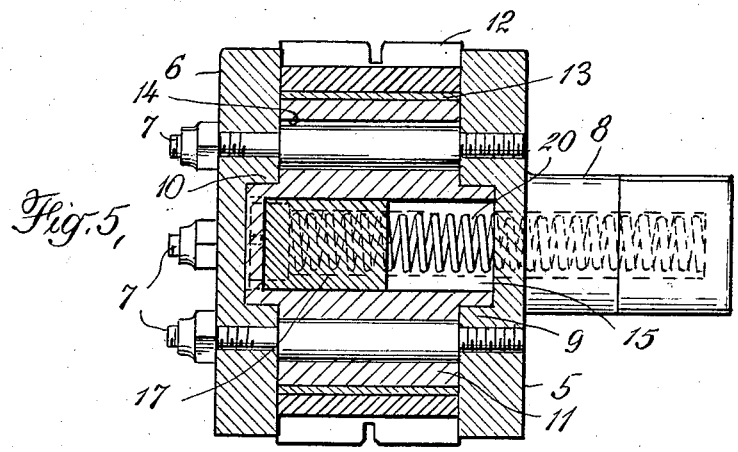
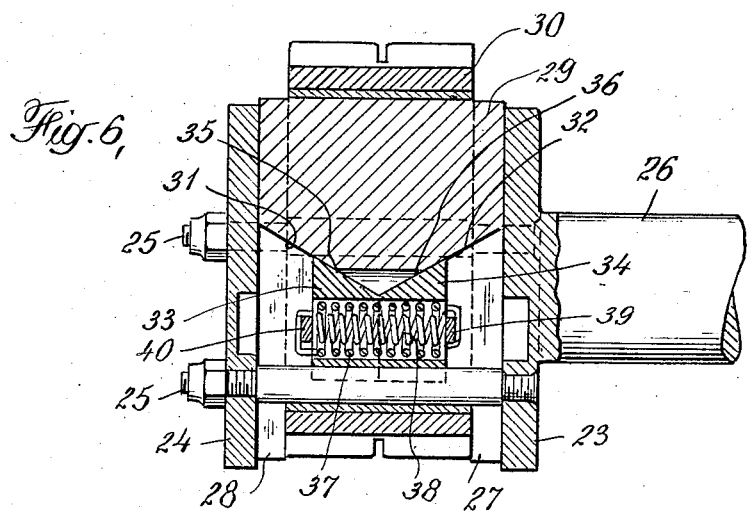
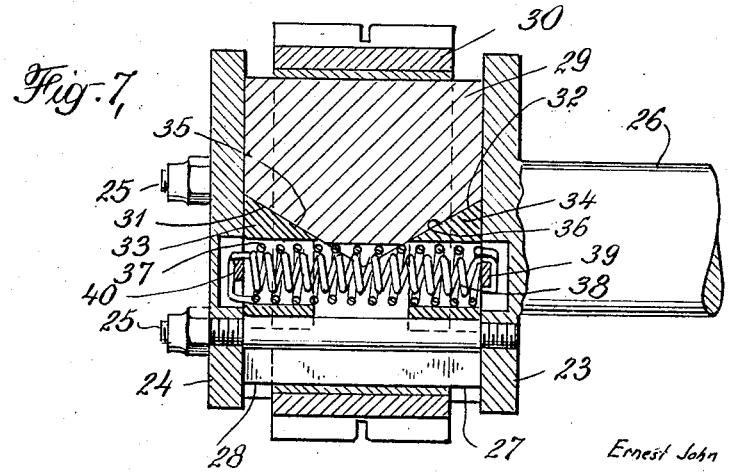
INVENTOR
Ernest John Opie
BY
Pennie Davis Marvin & Edmonds
ATTORNEYS Patented July 28, 1931

1,815,954

UNITED STATES PATENT OFFICE

ERNEST JOHN OPIE, OF MENANDS, NEW YORK, ASSIGNOR TO RAMSEY CHAIN CO., INC., OF ALBANY, NEW YORK, A CORPORATION OF NEW YORK

AUTOMATIC CHAIN OR BELT TIGHTENER

Application filed February 27, 1928. Serial No. 257,349.

This invention relates to belt or chain tighteners, and particularly to a device to take up automatically the slack due to stretching of belts or chains used for driving mechanism.

Belts and chains operate most effectively under more or less definite conditions of tension. Owing to wear or other causes elongation occurs with resulting loss of efficiency and liability to breakage. Usually provision is made for adjustment and attempts have been made to provide for taking up the slack automatically. Some devices intended to accomplish this object are available but they are generally unadapted for installation in machines where compactness and simplicity are essential.

It is the object of the present invention to provide a simple, compact and effective device which will automatically take up the slack of a belt or chain and maintain a uniform and predetermined tension thereof.

In carrying out the invention I provide a frame which is adapted to be mounted on any suitable fixed support and carries a slidable hub on which a pulley or gear is rotatably mounted. The pulley or gear is adapted to be engaged by the belt or chain. The hub is slotted to receive a block having an angular face which cooperates with a similar face on the hub. The block acts as a wedge under the influence of a spring to move the hub against the tension of the belt or chain. When the belt or chain is adjusted the hub is disposed in neutral position, that is to say, it is centered in the frame. As the belt or chain elongates in service the tension of the spring acting through the wedge moves the hub in the frame from its neutral position until the limit of such movement is reached. The range of movement of the hub may be sufficient to take up the slack which develops in the belt or chain during the normal life thereof so that the belt or chain is always maintained under a suitable tension to ensure maximum efficiency.

The invention may be embodied in various forms. Thus a single wedging block or two opposed blocks cooperating with suitable angular faces on the hub may be used. One or more springs may be provided to secure the desired or necessary tension. The spring or springs may be arranged so that adjustment of the tension may be made to meet the conditions of most efficient operation. Any suitable pulley or sprocket may be provided to cooperate with the belt or chain. Thus, if a pulley is used it may be a straight faced or V-type pulley and if a sprocket is employed it may be adapted for "silent" or ordinary roller chain.

Two forms of the invention are shown as examples of suitable structures in the accompanying drawings, in which Fig. 1 is a sectional view of the device showing the hub in neutral position;

Fig. 5 is a section on the line 5—5 of Fig. 2; and

Figs. 6 and 7 are sectional views of a modified form of the device embodying two wedging blocks.

Figure 1:
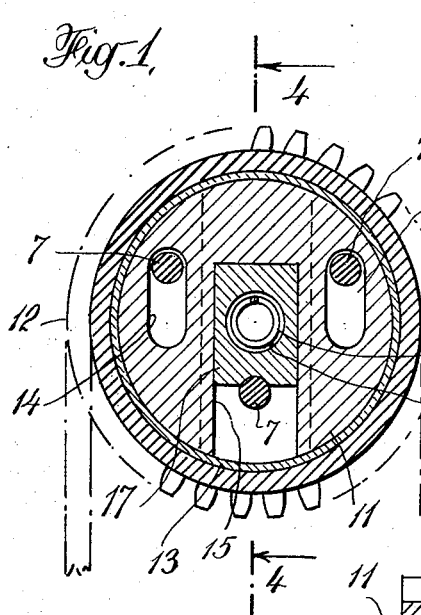
Figure 2:
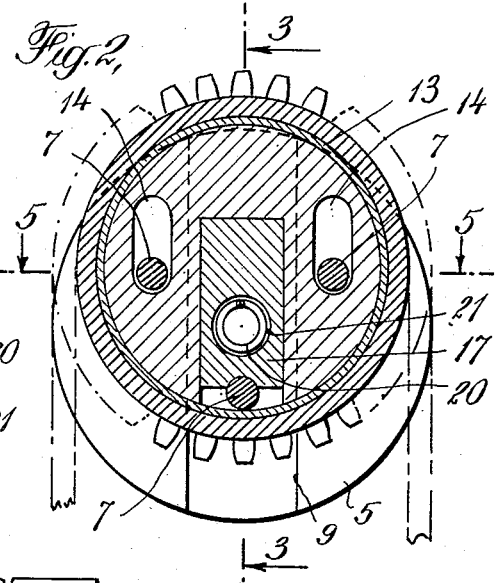
Fig. 2 is a similar view with the hub disposed at the limit of its movement.
Figure 3:
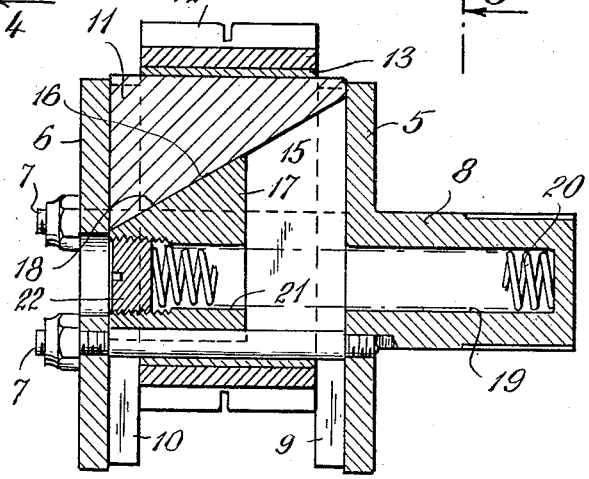
Fig. 3 is a section on the line 3—3 of Fig. 2.

Referring to the drawings, 5 and 6 indicate the oppositely disposed members of the frame which are connected by bolts 7. The member 5 has a laterally projecting shank 8 which is adapted to be mounted in any suitable stationary support. The members 5 and 6 of the frame are provided with inwardly projecting ribs 9 and 10 which are engaged in corresponding grooves formed in a hub 11 so that the hub is slidable in a straight line relatively to the frame. The hub forms a bearing for a rotatable member such as a sprocket 12, the latter being provided preferably with a bushing 13 to reduce the friction incident to the rotation of the sprocket on the hub. The hub 11 is provided with slots 14 embracing the bolts 7.

The hub is also provided with a centrally disposed slot 15 having a face 16 which is disposed angularly with respect to the axis of the hub. A block 17 with a cooperating face 18 is disposed in the slot 15 for engagement with the hub. The block 17 rests upon one of the bolts 7 and is preferably grooved to co-operate therewith, the bolt being adapted to resist the lateral thrust of the block as it is advanced from neutral position to move the hub 11 in the frame.

The shank 8 is provided with a recess 19 to receive a spring 20, one end of which is disposed in a similar recess 21 in the block 17. The recess 21 is closed by a threaded plug 22 against which the spring bears. The tension of the spring may, therefore, be modified by adjustment of the plug 22 so that the required tension can be maintained.

Figure 4:
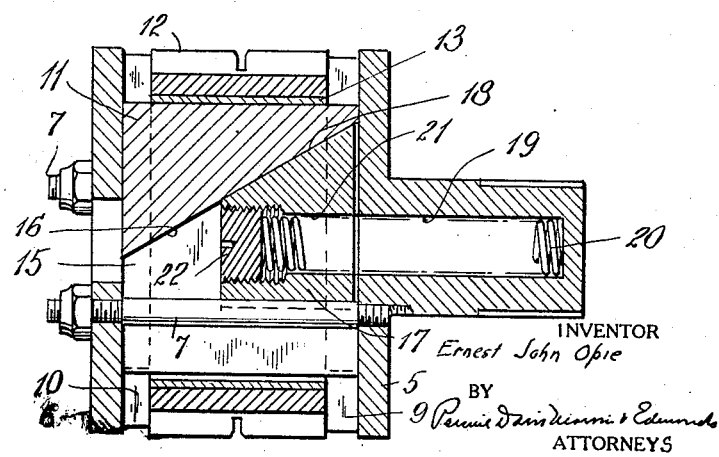
Fig. 4 is a section on the line 4—4 of Fig. 1.

The normal position of the block 17 is as indicated in Fig. 4, the hub 11 being centered in the frame. The belt or chain is adjusted about the pulley or sprocket with the hub thus positioned. As soon as the belt or chain commences to elongate the block 17 is advanced under the tension of the spring 20 and the wedging action of the cooperating faces 16 and 18 forces the hub outwardly in the frame to take up the slack of the belt or chain. As rapidly as elongation occurs it is taken up automatically so that the belt or chain remains constantly under the tension maintained by the spring 20. When the hub 11 reaches the limit of its outward movement the belt or chain, if still in good condition, can be shortened to permit the block 17 to return to its normal position. The operation will be repeated then as the belt or chain elongates. Normally, however, the range of adjustment is sufficient to properly correct the tension of the belt or chain during the normal life thereof.

Referring to Figs. 6 and 7 of the drawings, the structure is substantially the same and includes members 23 and 24 of the frame connected by bolts 25. A shank 26 connected to the member 23 permits mounting the device in a stationary support. The members 23 and 24 are provided with ribs 27 and 28 engaging in cooperating grooves of a hub 29 which supports a rotatable member such as a sprocket 30. A slot is provided in the hub 29 with faces 31 and 32 at one side thereof disposed in angular relation to the axis of the hub. Blocks 33 and 34 having corresponding faces are disposed within the slotted hub and are provided with faces 35 and 36 cooperating with the faces 31 and 32. The blocks rest upon one of the bolts 25 which resists the lateral thrust of the blocks. Springs 37 and 38 are disposed in suitable recesses in the blocks 33 and 34 and are connected at their ends to lugs 39 and 40.

The normal positions of the blocks 33 and 34 is as indicated in Fig. 7, the hub 29 being then disposed in neutral position. The springs 37 and 38 are under tension, tending to force the blocks toward each other. The belt or chain is disposed about the rotatable member 30 with the hub in neutral position as indicated in Fig. 7. Thereafter as the belt or chain elongates the blocks 33 and 34 are drawn toward each other and the hub 29 is forced outwardly to take up the slack of the belt or chain. The automatic adjustment continues until the blocks 33 and 34 reach the positions indicated in Fig. 6. Thereafter if the belt or chain is in good condition it can be shortened to permit the return of the hub to neutral position after which adjustment to take up the slack of the belt or chain continues automatically until the blocks 33 and 34 have again reached the position indicated in Fig. 6.

The device as described is simple and relatively inexpensive. It is likewise compact. It is certain in operation and it is capable of maintaining a uniform and suitable tension on a belt or chain without requiring attention or adjustment. The advantages afforded by such a device in connection with the mechanisms which are driven by belts or chains are sufficiently apparent.

As hereinbefore indicated, various changes may be made in the details of construction and arrangement of the parts without departing from the invention or sacrificing any of the advantages thereof.

I claim:

1. In an automatic device for tightening belts and chains, the combination of a frame, a hub slidable therein and forming a bearing, a rotatable member mounted thereon and resiliently tensioned wedging means for sliding the hub in the frame.

2. In an automatic device for tightening belts and chains, the combination of a frame, a hub slidable therein and forming a bearing, a rotatable member mounted thereon, resiliently tensioned wedging means for sliding the hub in the frame and means for adjusting the tension of the last-mentioned means.

3. In an automatic device for tightening belts and chains, the combination of a frame, a hub slidable therein and forming a bearing, a rotatable member mounted thereon, the hub having a slot with a face angularly disposed with respect to the axis of the hub, a wedge in the slot having a cooperating face and resilient means engaging the wedge to slide the hub in the frame.

4. In an automatic device for tightening belts and chains, the combination of a frame, a hub slidable therein and forming a bearing, a rotatable member mounted thereon, the hub having a slot with a face angularly disposed with respect to the axis of the hub, a wedge in the slot having a cooperating face, a resilient means engaging the wedge to slide the hub in the frame and means for adjusting the tension of the resilient means.

5. In an automatic device for tightening belts and chains, the combination of a frame having inwardly projecting ribs, a hub having grooves cooperating with the ribs to permit sliding movement of the hub in the frame, a rotatable member mounted on the hub and resiliently tensioned wedging means for sliding the hub in the frame.

6. In an automatic device for tightening belts and chains, the combination of a frame having inwardly projecting ribs, a hub having grooves cooperating with the ribs to permit sliding movement of the hub in the frame, a rotatable member mounted on the hub, resiliently tensioned wedging means for sliding the hub in the frame and means for adjusting the tension of the last-mentioned means.

7. The combination in an automatic take-up device of a sprocket wheel over which a chain passes, a slotted sliding hub on which the sprocket wheel revolves, a sliding wedge located in the elongated slot of the sliding hub with its angular face fitting against the angular side of said elongated slot.

8. The combination in an automatic take-up device of a sprocket over which a chain passes, a sliding hub on which the sprocket revolves, a taper wedge fitted into the sliding hub, a coil spring arranged to yieldingly move the hub in position to take up slack in the chain, and a screw plug against the spring for adjusting the tension of the coil spring.

9. The combination in an automatic take-up device of a sprocket over which a chain passes, a sliding hub on which the sprocket revolves, said sliding hub having an elongated recess in same, one end of which has a double angular side in relation to the center line of the hub.

10. The combination in an automatic take-up device of a sprocket over which a chain passes, a sliding hub with an elongated recess in same, with one end of said recess having a double angular arrangement with the centre line of the hub and two sliding wedges, each one fitted to one of the angles of the elongated recess so as to be opposite from each other.

11. The combination in an automatic take-up device of a sprocket over which a chain passes, a sliding hub on which the sprocket revolves, two taper wedges fitted into the sliding hub and a coil spring connected from one wedge to the other wedge and arranged to yieldingly hold the hub in position so that when slack occurs in the drive chain it will be automatically taken up by the spring.

12. In an automatic device for tightening belts and chains, the combination of a frame, a member slidable therein and providing a bearing, a rotatable member mounted thereon and resiliently tensioned wedging means for sliding the member in the frame.

13. In an automatic device for tightening belts and chains, the combination of a frame, a member slidable therein and providing a bearing, a rotatable member mounted thereon, resiliently tensioned wedging means for sliding the member in the frame and means for adjusting the tension of the last-mentioned means.

14. In an automatic device for tightening belts and chains, the combination of a frame, a member slidable therein and providing a bearing, a rotatable member mounted thereon, the member having a slot with a face angularly disposed with respect to the axis of the member, a wedge in the slot having a cooperating face and resilient means engaging the wedge to slide the member in the frame.

15. In an automatic device for tightening belts and chains, the combination of a frame having inwardly projecting ribs, a member having grooves cooperating with the ribs to permit sliding movement of the member in the frame, a rotatable member mounted on the member and resiliently tensioned wedging means for sliding the member in the frame.

In testimony whereof I affix my signature.

ERNEST JOHN OPIE.